(12) United States Patent
Suryanarayanan et al.

(10) Patent No.: US 10,348,582 B1
(45) Date of Patent: Jul. 9, 2019

(54) PROVIDING AN INSTANCE AVAILABILITY ESTIMATE

(71) Applicant: Amazon Technologies, Inc., Seattle, WA (US)

(72) Inventors: Deepak Suryanarayanan, Seattle, WA (US); David Everard Brown, Cape Town (ZA); Eric Wayne Schultze, Bellevue, WA (US); Roaan Hennie Vos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 14/867,634

(22) Filed: Sep. 28, 2015

Related U.S. Application Data

(63) Continuation of application No. 13/676,987, filed on Nov. 14, 2012, now Pat. No. 9,256,452.

(51) Int. Cl.
*G06F 9/46* (2006.01)
*H04L 12/26* (2006.01)
*G06F 9/455* (2018.01)

(52) U.S. Cl.
CPC .......... *H04L 43/04* (2013.01); *G06F 9/45533* (2013.01); *H04L 43/50* (2013.01)

(58) Field of Classification Search
CPC ...... H04L 43/04; H04L 43/50; G06F 9/45533
See application file for complete search history.

(56) References Cited

U.S. PATENT DOCUMENTS

| | | | | |
|---|---|---|---|---|
| 8,250,197 | B2 * | 8/2012 | Gulati | H04L 67/1097 709/217 |
| 8,818,988 | B1 * | 8/2014 | Brown | G06F 17/30306 707/713 |
| 2006/0013229 | A1 * | 1/2006 | Johansson | H04L 47/724 370/395.41 |
| 2009/0293056 | A1 * | 11/2009 | Ferris | G06F 9/5077 718/1 |
| 2010/0214124 | A1 | 8/2010 | Lozinski et al. | |
| 2013/0275961 | A1 * | 10/2013 | Anderson | G06F 9/5072 717/177 |

OTHER PUBLICATIONS

Final Office Action for U.S. Appl. No. 13/676,987, dated Mar. 27, 2015, Deepak Suryanarayanan, "Providing an Instance Availability Estimate", 5 pages.

* cited by examiner

*Primary Examiner* — Camquy Truong
(74) *Attorney, Agent, or Firm* — Lee & Hayes, P.C.

(57) ABSTRACT

Data defining the actual time to availability for various configurations of instances of computing resources is collected. The collected data can be utilized to provide an estimate of the expected time to availability for a specific configuration of an instance of a computing resource in response to receiving a request to create a new instance of the computing resource.

20 Claims, 9 Drawing Sheets

PROVIDING AN INSTANCE AVAILABILITY ESTIMATE

CROSS REFERENCE TO RELATED APPLICATIONS

This application is a continuation of co-pending U.S. application Ser. No. 13/676,987 filed Nov. 14, 2012 entitled "Providing an Instance Availability Estimate," which is expressly incorporated herein by reference in its entirety.

BACKGROUND

Network-based services exist that allow customers to purchase and utilize instances of computing resources ("instances"), such as virtual machine instances, on a permanent or as-needed basis. When a customer requests to instantiate a new instance of a computing resource, there is typically a delay between the time when the customer submits the request and the time that the instance actually becomes available for use by the customer. During the delay time, the customer is typically presented with an indication only that their instance will be ready for use "soon." This type of non-specific indication regarding the availability of an instance can, however, be frustrating for a customer.

The disclosure made herein is presented with respect to these and other considerations.

DETAILED DESCRIPTION

Figure 1:
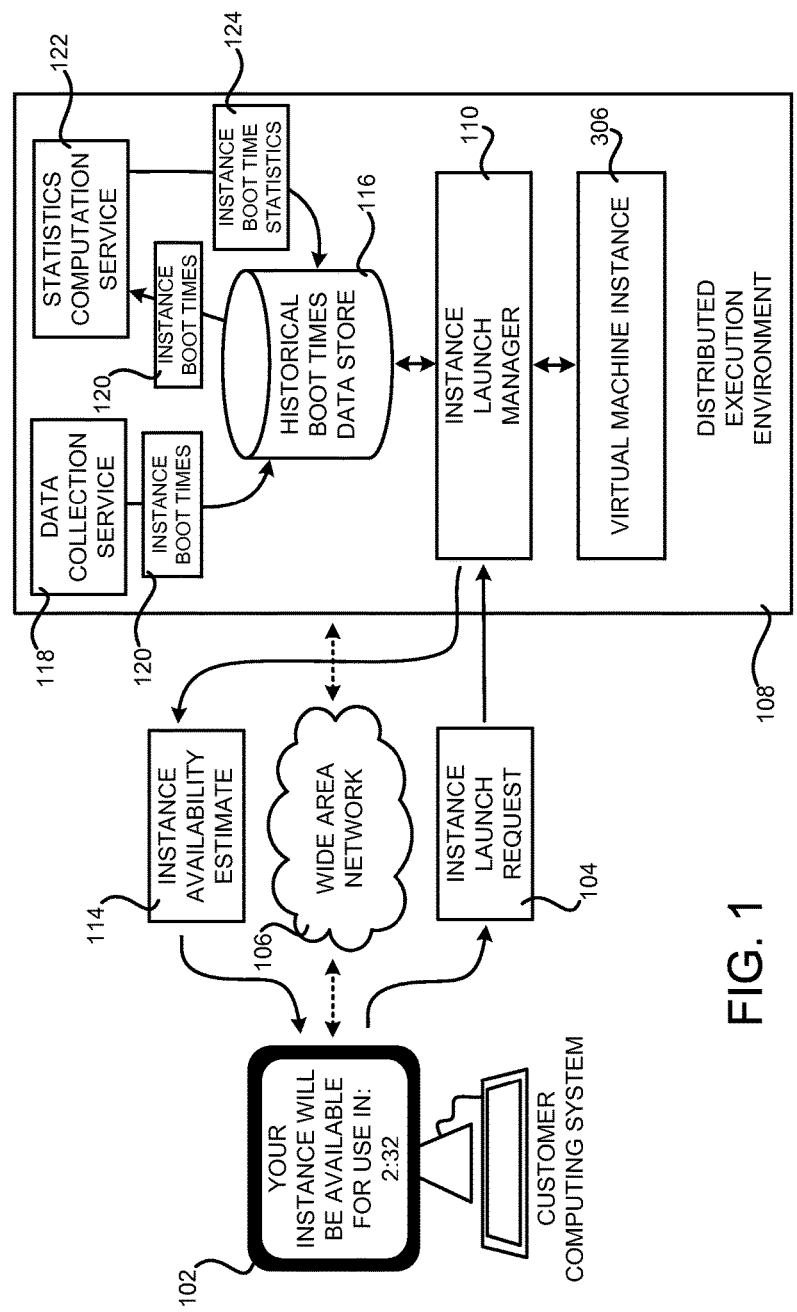
FIG. 1 is a computer system diagram providing an overview description of a mechanism disclosed herein for providing an instance availability estimate, according to one embodiment presented herein.

The following detailed description is directed to technologies for providing an instance availability estimate. Utilizing the technologies described herein, an estimate of the time to availability for an instance of a computing resource can be provided. For example, a customer of a distributed execution environment might request to launch a new virtual machine instance. Utilizing the mechanisms provided herein, an estimate of the time to availability for the new virtual machine instance could be presented to the customer while the customer waits for the new virtual machine instance to become available. Estimates of the time to availability for instances of other types of computing resources might also be provided in a similar manner.

According to one aspect presented herein, a computer-implemented mechanism is disclosed for providing an instance availability estimate. In one implementation, the mechanism operates in conjunction with a network-based distributed execution environment in which customers can purchase and utilize instances of computing resources, such as virtual machine instances, on a permanent or as-needed basis. This service may offer instances of computing resources for purchase in various configurations. For example, the service might offer virtual machine instances available for purchase and use that have many different configurations of processor capabilities, main memory, disk storage, and operating system.

In order to provide the functionality disclosed herein, a data collection service is executed within the distributed execution environment in some implementations. The data collection service is configured to monitor the instantiation of new instances of computing resources and to collect data regarding the actual time to availability of various configurations of the instances. For example, in the case of virtual machine instances, the data collection service might collect data regarding the actual time taken to boot virtual machine instances having various processor, memory, disk, and operating system configurations. The data collection service might also collect data defining the actual amount of time for instances of other types of computing resources to become available for use. The data collection service stores the collected data in a historical boot times data store in one embodiment. Other types of data stores might also be utilized.

In one implementation, the data collection service is configured to collect data regarding the actual time to availability of instances of computing resources instantiated by customers or other users of the distributed execution environment. In other implementations, however, a test harness service is executed in the distributed execution environment to launch instances of configurations of computing resources for which insufficient data exists to generate an estimate of the time to availability for the instance types. For example, if certain configurations of virtual machine instances are rarely launched by customers or other users of the distributed execution environment, the test harness service might launch instances of the rarely used configurations so that the data collection service can collect data regarding the actual time to launch the instances. The test harness service might also launch instances of other types of computing resources in order to enable the data collection service to collect data regarding the actual time to availability of the instances.

When a request is received from a customer of the distributed execution environment to instantiate an instance of a computing resource, the data collected and stored by the data collection service is utilized to provide an estimate of the time to availability for the requested instance. As an example, a customer of the distributed execution environment might request to launch a virtual machine instance having a specific configuration and in a certain location (e.g. data center or geographical region). In response thereto, an estimate of the time to availability of the specific configuration of the virtual machine instance might be provided to the customer while the customer awaits availability of the new virtual machine instance.

In order to provide the estimate of the time to availability, a statistics computation service is executed in the distributed execution environment in one implementation. The statistics computation service retrieves the data stored in the historical boot times data store by the data collection service and generates statistics for unique configurations of instances of computing resources. For example, the statistics computation service might generate statistics for virtual machine instances having particular configurations of processor, memory, disk, and operating system. The statistics computation service might also generate statistics for other types of instances of computing resources having other types of configurations and other attributes (e.g. data center or geographic region).

In one implementation, the statistics computation service is configured to generate a mean boot time and a standard deviation for the time to availability of various configurations of instances of computing resources. For example, the statistics computation service might compute a mean and standard deviation of the recorded actual boot times for each unique configuration of processor, memory, disk, and operating system for virtual machine instances. The statistics computation service might also compute the mean and standard deviation of the recorded actual time to availability for various configurations of other types of instances of computing resources. The statistics computation service might also compute a 95% confidence estimate of the time to availability for each configuration of instances of a computing resource. Other confidence levels might also be computed for the time to availability. The statistics computation service stores the computed statistics in the historical boot times data store in one embodiment.

When a request is received to instantiate a new instance of a computing resource, the data stored in the historical boot times data store is utilized to generate an estimate of the time to availability for the requested instance (the estimate of the time to availability might be referred to herein as an "instance availability estimate"). For example, in the case of a request to launch a virtual machine instance, the 95% confidence estimate of the time to availability for the requested configuration of the virtual machine instance might be retrieved and provided to the customer or other user requesting the launch of the new instance. In other embodiments, other estimates such as the mean of the actual recorded launch times for similar configurations might be provided to the customer.

In some implementations, there may be a delay between the time a request is received to instantiate a new instance of a computing resource and the time at which instantiation of the computing resource begins. This delay might be caused, for instance, by the time required for various Web service application programming interfaces ("APIs") to be called to begin instantiation of the new instance of the computing resource. As an example, it might be necessary for various APIs to be called in order to begin booting a new virtual machine instance in a distributed execution environment. In order to account for this time, the estimate of the time to availability for a requested instance provided to a customer might include an estimate of the time between when a request to instantiate the instance is received and when instantiation of the instance actually begins. In this way, the estimate of the time to availability may describe the total estimated time from when a request to instantiate a new instance of a computing resource is received and the time at which the new instance will become available for customer use.

In some implementations, the instance availability estimates computed in the manner described above might be made available for consumption and use by other components or systems. For example, in one implementation, an API is provided through which callers can obtain an instance availability estimate for a particular instance or instance type. Such an API might be utilized, for example, by an autoscaling component when determining the time at which new instances of computing resources should be launched. Other mechanisms might also be utilized to expose the instance availability information to interested parties, such as a management console. Additional details regarding the various components and processes described above for providing an instance availability estimate will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for providing an instance availability estimate 114, according to one embodiment presented herein. In one embodiment, the mechanism disclosed herein operates in conjunction with a network-based distributed execution environment 108 in which customers can purchase and utilize instances of computing resources, such as a virtual machine instance 306, on a permanent or as-needed basis. This distributed execution environment 108 may offer instances of computing resources for purchase in various configurations. For example, the distributed execution environment 108 might offer virtual machine instances 306 available for purchase and use that have many different configurations of processor capabilities, main memory, disk storage, and operating system. The distributed execution environment 108 might also offer instances of other types of computing resources for purchase and use by customers.

In order to utilize a new instance, a customer of the distributed execution environment 108 might utilize a customer computing system 102 to transmit an instance launch request 104 to the distributed execution environment 108. The customer computing system 102 may be a server computer, a desktop or laptop personal computer, a tablet computer, a smartphone, a PDA, an e-reader, a game console, a set-top box, or any other computing device capable of accessing the distributed execution environment 108. The customer computing system 102 might access the distributed execution environment 108 over a suitable data communications network, such as a wide area network ("WAN") 106.

The instance launch request 104 specifies the type and configuration for a new instance of a computing resource to be instantiated in the distributed execution environment 108. For example, in the case where a customer is requesting to instantiate a new virtual machine instance 306, the instance launch request 104 might specify a hardware configuration for the new virtual machine instance, such as the amount of processing capability, memory capacity, and disk storage. The instance launch request 104 might also specify an operating system that should be utilized by the new virtual machine instance 306. The instance launch request 104 might also specify other types of information, such as the geographic region and/or data center in which the new instance should be created. The instance launch request 104 might specify other types of configuration data when the customer is requesting to instantiate instances of other types of computing resources, such as the amount of storage requested in the case of instances of storage resources.

An instance launch manager 110 receives the instance launch request 104 in one implementation. In response to receiving the instance launch request 104, the instance launch manager 110 causes an instance availability estimate 114 to be transmitted to the customer computing system 102. The instance availability estimate 114 provides an estimate of the time to availability for the new instance requested by the customer. For example, as shown in FIG. 1, the instance availability estimate 114 might indicate that the new instance will be available for use by the customer in a certain number of hours, minutes, and seconds. This number might be counted down until the time to availability is zero. In other implementations, the instance availability estimate 114 indicates the time at which the new instance will become available. In even other implementations, the instance availability estimate 114 might be presented as a percentage and updated periodically as the time to availability decreases. The instance availability estimate 114 might also be displayed through a management console or other types of user interfaces. The instance availability estimate 114 might also be updated during the display of the instance availability estimate 114 in order to provide a user with an up-to-date estimate. It should be appreciated that these examples are merely illustrative and that other types of data defining the amount of time until, or the time at which, an instance will become available for use by a customer or other user of the distributed execution environment 108 might be presented.

In order to generate the instance availability estimate 114, a data collection service 118 is executed within the distributed execution environment 108 in some implementations. As discussed briefly above, the data collection service 118 is configured to monitor the instantiation of new instances of computing resources and to collect data regarding the actual time to availability of various configurations of the instances. For example, in the case virtual machine instances 306, the data collection service 118 might collect data regarding the actual time taken to boot virtual machine instances 306 having various processor, memory, disk, and operating system configurations. The data collection service 118 might also collect data defining the actual amount of time for instances of other types of computing resources to become available for use by a customer or other users of the distributed execution environment 108. The data collection service 118 stores the collected data defining instance boot times 120 in a historical boot times data store 116 in one embodiment. Other types of data stores might also be utilized to store data defining the actual times required for instances of computing resources to become available for use.

In one implementation, the data collection service 118 is configured to collect data regarding the actual time to availability of instances of computing resources instantiated by customers or other users of the distributed execution environment 108. In other implementations, however, a test harness service (not shown in FIG. 1) is executed in the distributed execution environment 108 to launch instances of various configurations of computing resources for which insufficient data exists to generate an accurate instance availability estimate 114. For example, if certain configurations of virtual machine instances 306 are rarely launched by customers or other users of the distributed execution environment 108, the test harness service might launch instances of the rarely used configurations so that the data collection service 118 can collect instance boot times 120 for the instances. The test harness service might also launch instances of other types of computing resources in order to enable the data collection service 118 to collect data regarding the actual time to availability of the instances.

When an instance launch request 104 is received from a customer or other user of the distributed execution environment 108 to instantiate an instance of a computing resource, the data collected and stored by the data collection service 118 is utilized to provide the instance availability estimate 114 for the requested instance. As an example, a customer of the distributed execution environment 108 might request to launch a virtual machine instance 306 having a specific configuration. In response thereto, an instance availability estimate 114 indicating the estimated time to availability for the new instance might be provided to the customer by way of the customer computing system 102 while the customer awaits availability of the new virtual machine instance.

In order to provide the instance availability estimate, a statistics computation service 122 is also executed in the distributed execution environment 108 in one implementation. The statistics computation service 122 retrieves the instance boot times 120 stored in the historical boot times data store 116 by the data collection service 122 and generates instance boot time statistics 124 for unique configurations of instances of computing resources. For example, the statistics computation service 122 might generate instance boot time statistics 124 relating to the boot times for virtual machine instances 306 having particular configurations of processor, memory, disk, and operating system. The statistics computation service 122 might also segment the generated statistics by geographic region, data center, or other attribute. In this manner, more accurate statistics for the time to availability for instances created in certain regions and/or data centers might be provided. The statistics computation service 122 might also generate instance boot time statistics 124 for other types of instances of computing resources having other types of configurations.

In one implementation, the statistics computation service 122 is configured to generate a mean boot time and a standard deviation for the time to availability of various configurations of instances of computing resources. For example, the statistics computation service 122 might compute a mean and standard deviation of the recorded actual boot times for each unique configuration of processor, memory, disk, and operating system for virtual machine instances 306. The statistics computation service 122 might also compute the mean and standard deviation of the recorded actual time to availability for various configurations of other types of instances of computing resources. The statistics computation service 122 might also compute a 95% confidence estimate of the time to availability for each configuration of instances of a computing resource. Other confidence levels might also be computed for the time to availability. The statistics computation service stores the computed statistics in the historical boot times data store 116 in one embodiment. Additional details regarding the statistics generated by the statistics computation service 122 and the structure and format of the historical boot times data store 116 in one implementation will be provided below with regard to FIG. 7.

When an instance launch request 104 is received to instantiate a new instance of a computing resource, such as a virtual machine instance 306, the instance boot time statistics 124 stored in the historical boot times data store 116 is utilized to generate the instance availability estimate 114 for the newly requested instance. For example, in the case of a request to launch a virtual machine instance 305, the 95% confidence estimate of the time to availability for the requested configuration and/or location of the virtual machine instance 306 might be retrieved from the historical boot times data store 116 and provided to the customer or other user requesting the launch of the new instance 306 as the instance availability estimate 114. In other embodiments, other estimates such as the mean of the actual recorded launch times for similar configurations might be provided to the customer.

As described briefly above, there may be a delay between the time a request 104 is received to instantiate a new instance of a computing resource and the time at which instantiation of the computing resource begins. This delay might be caused, for instance, by the time required for various Web service APIs to be called within the distributed execution environment 108 to begin instantiation of the new instance of the computing resource. As an example, it might be necessary for various APIs to be called in order to begin booting a new virtual machine instance 306 in the distributed execution environment 108.

In order to account for the delay from when a request 104 is received and the time at which instantiation of a new instance begins, the instance availability estimate 114 provided to a customer might include an estimate of the time between when a request 104 to instantiate a new instance is received and when instantiation of the instance actually begins within the distributed execution environment 108. In this way, the estimate 114 of the time to availability may describe the total estimated time from when a request 104 to instantiate a new instance of a computing resource is received and the time at which the new instance will become available for customer use.

As mentioned above, an instance availability estimate 114 computed in the manner described above might be made available for consumption and use by other components or systems. For example, in one implementation, the instance launch manager 110 or another component is configured to expose an API through which callers can obtain an instance availability estimate 114 for a particular instance or instance type. Such an API might be utilized, for example, by an autoscaling component when determining the time at which new instances of computing resources should be launched. Other mechanisms might also be utilized to expose the instance availability information to interested parties, such as a management console. Additional details regarding the various components and processes described above for providing an instance availability estimate 114 will be presented below with regard to FIGS. 2-10.

Figure 2:
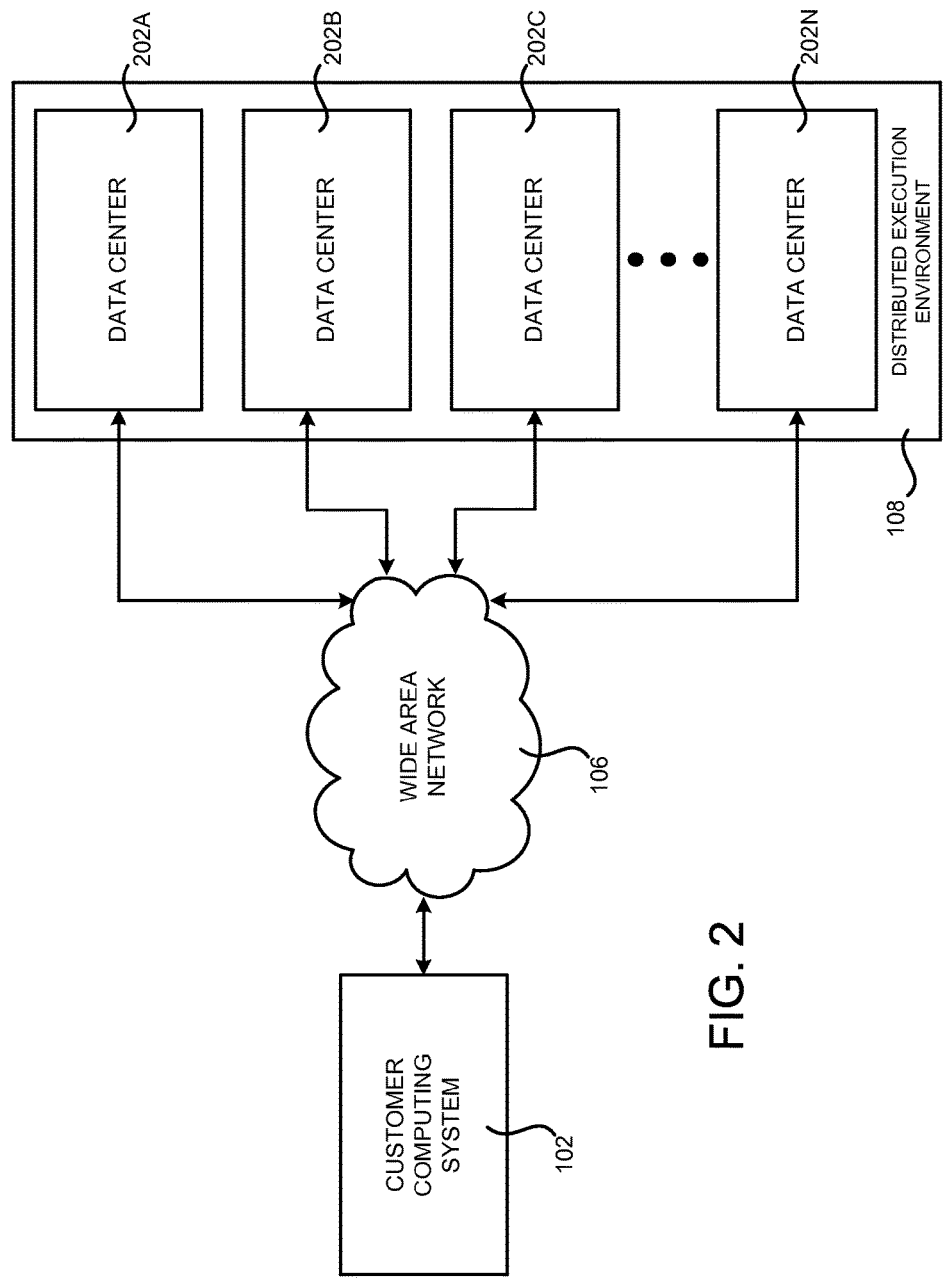
FIG. 2 is a system and network diagram that shows an illustrative operating environment that includes a distributed execution environment configured for providing an instance availability estimate, according to one embodiment disclosed herein.

FIG. 2 and the following description are intended to provide a brief, general description of a suitable computing environment in which the embodiments described herein may be implemented. In particular, FIG. 2 is a system and network diagram that shows an illustrative operating environment 200 that includes a distributed execution environment 108 capable of providing an instance availability estimate 114 in the manner disclosed herein.

As discussed briefly above, the distributed execution environment 108 can provide instances of computing resources on a permanent or an as-needed basis. The instances of computing resources provided by the distributed execution environment 108 may include various types of resources, such as data processing resources, data storage resources, data communication resources, and the like. Each type of computing resource may be general-purpose or may be available in a number of specific configurations. For example, and as will be described in greater detail below, instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Instances of remote desktop sessions might also be utilized in various embodiments presented herein. A remote desktop session may be established utilizing the remote desktop protocol ("RDP") or another similar protocol for viewing and interacting with a graphical user interface provided by another computer.

Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity. Additional details regarding the various types of resources offered by the distributed execution environment 108 will be provided below with regard to FIG. 4.

The instances of computing resources provided by the distributed execution environment 108 are enabled in one implementation by one or more data centers 202A-202N

(which may be referred herein singularly as "a data center 202" or in the plural as "the data centers 202"). The data centers 202 are facilities utilized to house and operate computer systems and associated components. The data centers 202 typically include redundant and backup power, communications, cooling, and security systems. The data centers 202 might also be located in geographically disparate locations. One illustrative configuration for a data center 202 that implements the concepts and technologies disclosed herein for providing an instance availability estimate will be described below with regard to FIG. 3.

The customers and other consumers of the distributed execution environment 108 may access the computing resources provided by the data centers 202 over a WAN 106. Although a WAN 106 is illustrated in FIG. 2, it should be appreciated that a local-area network ("LAN"), the Internet, or any other networking topology known in the art that connects the data centers 202 to remote customers and other users may be utilized. It should also be appreciated that combinations of such networks might also be utilized.

Figure 3:
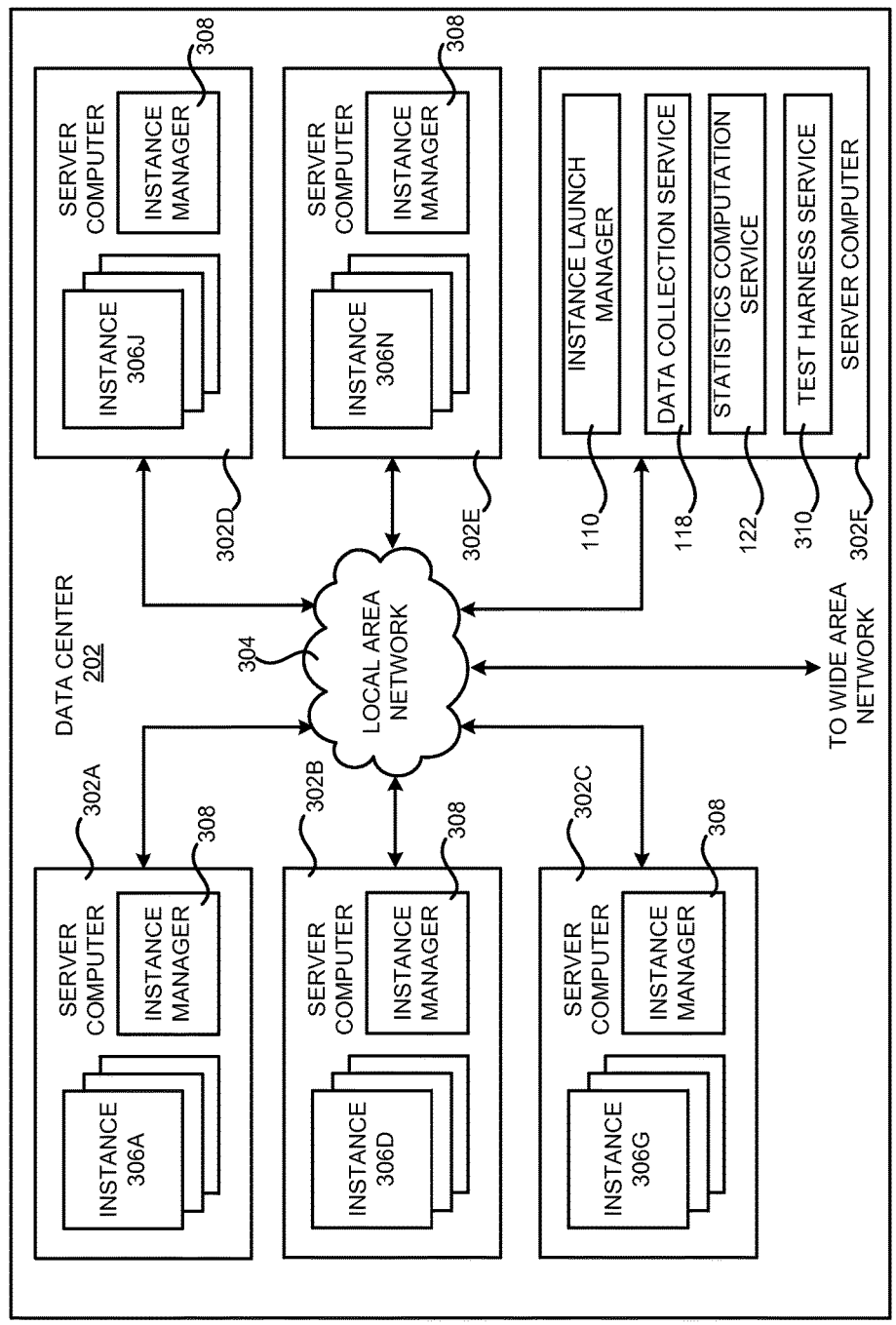
FIG. 3 is a computing system diagram that illustrates one configuration for a data center that implements aspects of the concepts and technologies disclosed herein for providing an instance availability estimate, according to one embodiment disclosed herein.

FIG. 3 is a computing system diagram that illustrates one configuration for a data center 202 that implements a distributed execution environment 108, including the concepts and technologies disclosed herein for providing an instance availability estimate 114. The example data center 202 shown in FIG. 3 includes several server computers 302A-302F (which may be referred herein singularly as "a server computer 302" or in the plural as "the server computers 302") for providing instances of computing resources. The server computers 302 may be standard tower or rack-mount server computers configured appropriately for providing the computing resources described herein. For example, in one implementation the server computers 302 are configured to provide instances 306A-306N of computing resources.

In one embodiment, the instances 306A-306N (which may be referred herein singularly as "an instance 306" or in the plural as "the instances 306") are virtual machine instances. As known in the art, a virtual machine instance is an instance of a software implementation of a machine (i.e. a computer) that executes programs like a physical machine. Each of the servers 302 may be configured to execute an instance manager 308 capable of instantiating and managing instances of computing resources. In the case of virtual machine instances, for example, the instance manager 308 might be a hypervisor or another type of program configured to enable the execution of multiple virtual machine instances 306 on a single server 302, for example.

It should be appreciated that although the embodiments disclosed herein are described primarily in the context of virtual machine instances, other types of instances of computing resources can be utilized with the concepts and technologies disclosed herein. For instance, the technologies disclosed herein might be utilized with instances of hardware resources, instances of storage resources, instances of data communications resources, and with other types of resources. In this manner, the technologies disclosed herein can provide an estimate of the time until availability of any type of computing resource made available through the distributed execution environment 108.

The data center 202 shown in FIG. 3 also includes a server computer 302F reserved for executing software components for managing the operation of the data center 202, the server computers 302, and the instances 306. In particular, the server computer 302F might execute the instance launch manager 110, the data collection service 118, the statistics computing service 122, and the test harness service 310. Additional details regarding the operation of the data collection service 118 will be provided below with regard to FIG. 5. Additional details regarding the operation of the statistics computation service 122 will be provided below with regard to FIG. 6. Additional details regarding the operation of the instance launch manager 110 will be provided below with regard to FIG. 8. Additional details regarding the operation of the test harness service 310 will be provided below with regard to FIG. 9. The server computer 302F might also store the historical boot times data store 116. Additional details regarding the historical boot times data store will be provided below with regard to FIG. 7.

In the example data center 202 shown in FIG. 3, an appropriate LAN 304 is utilized to interconnect the server computers 302A-302E and the server computer 302F. The LAN 304 is also connected to the WAN 106 illustrated in FIGS. 1 and 2. It should be appreciated that the network topology illustrated in FIGS. 1-3 has been greatly simplified and that many more networks and networking devices may be utilized to interconnect the various computing systems disclosed herein. Appropriate load balancing devices or software modules might also be utilized for balancing a load between each of the data centers 202A-202N, between each of the server computers 302A-302F in each data center 202, and between instances 306 of computing resources purchased by each customer of the distributed execution environment 108.

It should be appreciated that the data center 202 described in FIG. 3 is merely illustrative and that other implementations might be utilized. In particular, functionality described herein as being performed by the instance launch manager 110, the data collection service 118, the statistics computing service 122, and the test harness service 310 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 4:
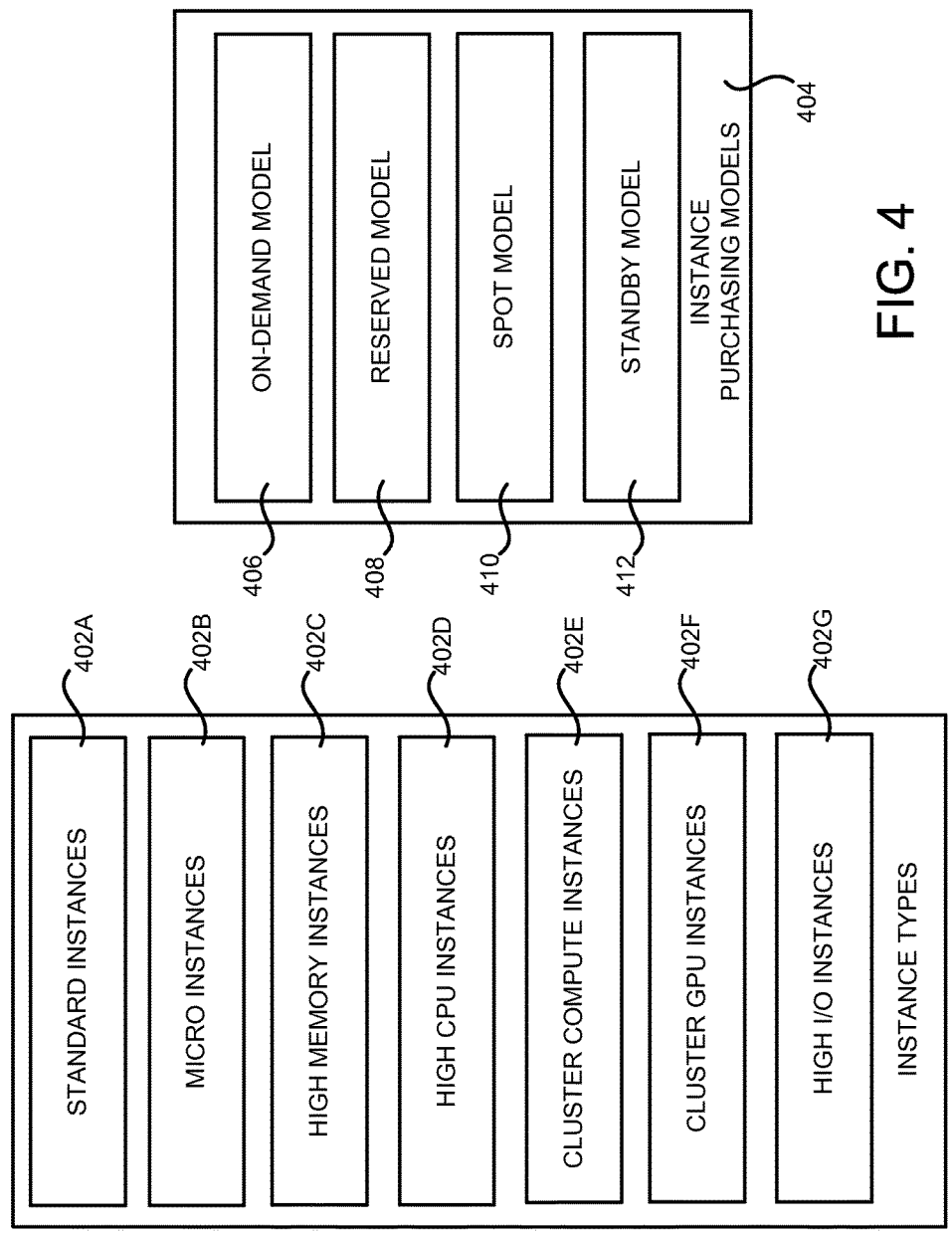
FIG. 4 is a block diagram showing aspects of various virtual machine instance types and instance purchasing models that might be utilized in the embodiments disclosed herein.

FIG. 4 is a block diagram illustrating several types of instances of computing resources, along with several purchasing models that might be utilized to set the price for instances, available within the distributed execution environment 108, according to embodiments disclosed herein. As described briefly above, the instances of computing resources provided by the distributed execution environment 108, such as virtual machine instances, may be made available to customers in a number of different types, or configurations. The example instance types shown in FIG. 4 indicates that the following virtual machine instance types are available for use within the distributed execution environment 108: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances are instances 306 that are configured with generally proportional amounts of CPU and memory. Standard instances may be suitable for common computing applications. Standard instances may be made available in various sizes in some embodiments. For example, "small", "medium", "large", and "extra large" instances may be made available, with each of these instances having greater amounts of CPU and memory, while maintaining approximately similar ratios of CPU to memory.

Micro instances are instances 306 that provide a small amount of consistent CPU resources and allow CPU capacity to be increased in short bursts when additional cycles are available. Micro instances may be suited for lower throughput applications and Web sites that require additional compute cycles periodically.

High memory instances are instances 306 that have proportionally more random access memory ("RAM") resources than CPU resources. High memory resources are suitable for high throughput applications, including database and memory caching applications. For example, various types of high memory instances might offer between 17.1 and 68.4 GB of RAM in embodiments disclosed herein. Larger main memory sizes might also be made available to customers of the distributed execution environment 108. In contrast, high CPU virtual machine instances 306 have proportionally more CPU resources than RAM memory resources and are well suited for compute-intensive applications.

Cluster compute instances are instances 306 that offer proportionally high CPU resources with increased network performance. Cluster compute instances are well suited for High Performance Compute ("HPC") applications and other demanding network-bound applications. Cluster GPU instances are virtual machine instances 306 that provide general-purpose GPUs with proportionally high CPU and increased network performance for applications benefitting from highly parallelized processing, including HPC, rendering and media processing applications. While cluster compute instances provide the ability to create clusters of instances connected by a low latency, high throughput network, cluster GPU instances provide an additional option for applications that can benefit from the efficiency gains of the parallel computing power of GPUs over what can be achieved with traditional processors.

High I/O instances are instances 306 that provide very high disk I/O performance and are ideally suited for many high performance database workloads. High I/O instances may utilize solid state-drive ("SSD")-based local instance storage for high I/O throughput. High I/O instances might also provide high levels of CPU, memory, and network performance.

It should be appreciated that the various virtual machine instance types described above are merely illustrative. Other virtual machine instance types not described herein might be utilized with the various concepts and technologies described herein. Additionally, in some embodiments, virtual machine instances may be made available in various sizes having continuous ratios of CPU to memory. Additionally, as discussed above, the embodiments disclosed herein might also be utilized with other types of instances of computing resources.

It should also be appreciated that the various instance types described above might be utilized with various operating systems. For example, a customer of the distributed execution environment 108 might request to execute a high CPU virtual machine instance executing the LINUX operating system. Similarly, a customer or other user of the of the distributed execution environment 108 might request to use a cluster compute instance executing the MICROSOFT WINDOWS SERVER operating system. Other operating systems might also be utilized.

In this regard, it should also be appreciated that the various instance types described above might take different times to boot and become available for use by a customer of the distributed execution environment. The amount of time required for an instance to become available for use might depend upon the type and configuration of the instance, the operating system utilized by the instance, the hardware upon which the instance is executing, the other tasks that are executing on the same hardware as the instance, the data center and/or geographic region in which the instance is executing and, potentially, one or more other factors. The embodiments disclosed herein might consider some or all of these factors when computing an instance availability estimate 114 in the manner presented herein.

As also shown in FIG. 4, the various virtual machine instance types described above might be priced according to various instance purchasing models 404. For instance, in the example shown in FIG. 4, instances of computing resources may be priced according to an on-demand model 406, a reserved model 408, a spot model 410, or a standby model 412. Aspects of each of these instance purchasing models are described in greater detail below.

Instances of computing resources priced according to the on-demand model 406, which may be referred to herein as "regular" instances, are instances 306 that are paid for and in active use by a customer. The on-demand model 406 allows customers of the distributed execution environment 108 to pay for capacity per unit of time, such as an instance-hour, without requiring a long-term commitment. This may free the customer from the costs and complexities of planning, purchasing, and maintaining hardware and transforms what are commonly large fixed costs into much smaller variable costs.

Instances of computing resources priced according to the reserved model 408, which might be referred to herein as "reserved instances", are instances of a computing resource that are reserved for a customer in exchange for a payment. The reserved model 408 provides a customer the option to make a one-time payment for each instance they want to reserve. In turn, the customer may receive a significant discount on the hourly usage charge for reserved instances as compared to on-demand instances. After the customer makes a one-time payment for reserved instances, the reserved instances are reserved for the customer and the customer has no further obligation. The customer may choose to run the reserved instances for the discounted usage rate for the duration of a chosen term. If the customer does not use the reserved instances, the customer will not pay usage charges on these instances.

The spot model allows customers to bid on unused capacity in the distributed execution environment 108. The customer can run the instances 306 priced according to the spot model, which may be referred to herein as "spot instances", for as long as their bid exceeds a current market price, called the spot instance market price. The spot instance market price may fluctuate based upon the supply of instances and the customer demand for the instances. Spot instances may be terminated if a customer's maximum bid no longer exceeds the current spot instance market price.

In order to obtain spot instances, a customer places a request for spot instances that specifies the desired number of spot instances and the maximum price the customer is willing to pay per instance hour. If the customer's maximum price bid exceeds the current spot instance market price for the spot instances, the customer's request will be fulfilled and the customer's spot instances will run until either the customer chooses to terminate them or the market price increases above the customer's maximum price (whichever is sooner). Various components operating within the distributed execution environment 108 may manage the market for the spot instances, including setting the current spot instance market price for the spot instances.

Instances of computing resources purchased according to the standby model 412, which might be referred to as "standby instances", are spot instances that have been acquired on behalf of a customer and that are made ready for near immediate use by the customer in the manner described herein. The price charged for standby instances is typically less than the price charged for on-demand instances, since the standby instances may be terminated in the same manner as spot instances. In one embodiment, standby instances are priced higher than spot instances and reserved instances, but lower than on-demand instances. Standby instances might also be available for use faster than other instance types. As a result, the embodiments disclosed herein might utilize the pricing model for a particular instance when computing the instance availability estimate 114.

It should be appreciated that the various instance purchasing models 404 described above for on-demand instances, reserved instances, spot instances, and standby instances are merely illustrative and that other mechanisms may be utilized to set the pricing for the various instance types. It should also be appreciated that the embodiments disclosed herein may be utilized with any of the instance types and purchasing models 404 shown in FIG. 4 and other configurations of instances and purchasing models 404 not shown in FIG. 4. Additionally, it should be appreciated that instances of other types of computing resources might also be priced according to the instance purchasing models 404 shown in FIG. 4 or others.

Figure 5:
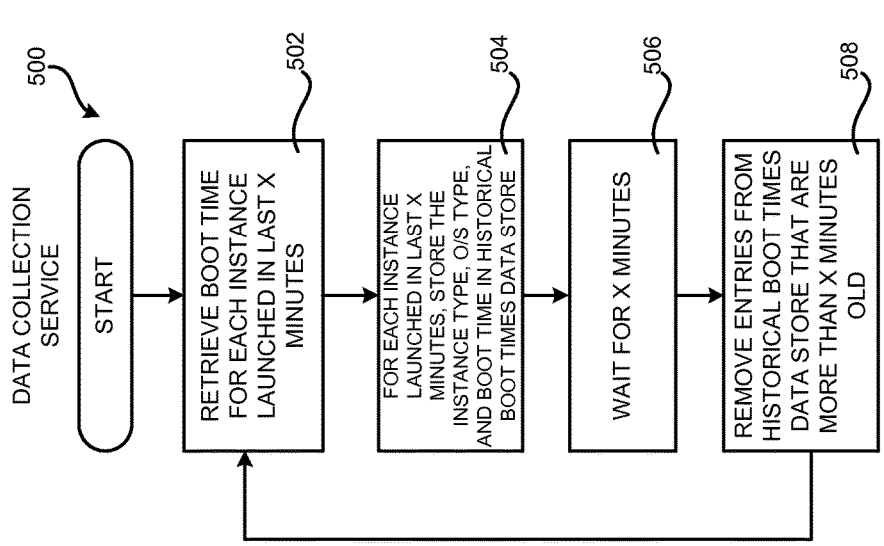
FIG. 5 is a flow diagram showing one illustrative routine that describes aspects of the operation of a data collection service utilized to provide an instance availability estimate in one embodiment disclosed herein.

FIG. 5 is a flow diagram showing one illustrative routine 500 that describes aspects of the operation of a data collection service 118 utilized to provide an instance availability estimate 114 in one embodiment disclosed herein. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at operation 502, where the data collection service 118 retrieves the actual boot times for one or more instances that were launched in a previous period of time, such as the last five minutes or other period of time. The actual boot times represent the amount of time from when an instance starts booting until the time at which the instance is available for use by a customer or other user of the distributed execution environment 108. The data collection service 118 might collect the actual boot times in real time in other embodiments. The data collection service 118 might also collect the actual boot times from the instances 306 themselves, from the instance manager 308, or from another component within the distributed execution environment 108 that has access to the boot times.

From operation 502, the routine 500 proceeds to operation 504, where the data collection service 118 stores the collected boot times in the historical boot times data store 116.

Figure 7:
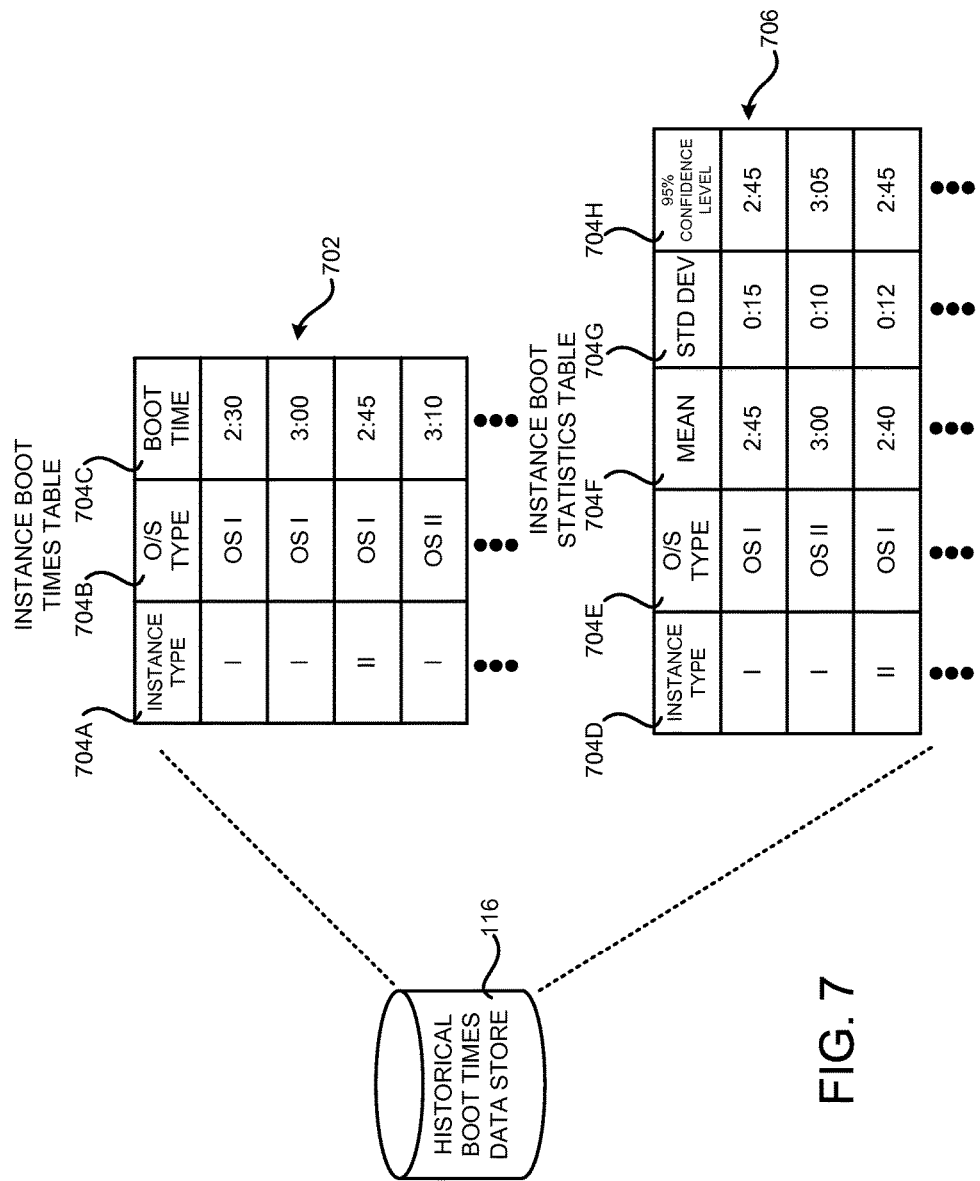
FIG. 7 is a database diagram showing aspects of one configuration for a historical boot times data store utilized in some embodiments to provide an instance availability estimate.

For example, as shown in FIG. 7, the historical boot times data store 116 includes an instance boot times table 702 in one implementation. In this embodiment, the instance boot times table 702 includes fields 704A and 704B that identify the particular configuration of instance type and operating system, respectively. The instance boot times table 702 also includes a field 704C for storing the actual collected boot time of the corresponding instance type and operating system.

In some embodiments, the data collection service 118 also stores other data in the instance boot times table 702 associated with each collected boot time which might include, but is not limited to, the type of instance, the operating system executing on the instance, the type of hardware upon which the instance was executed, the other tasks executing on the hardware, the rack, data center, and/or region in which the instance was booted, the time, day of week, and/or month of year when the instance was launched, the pricing model associated with the instance, and potentially other information. Additional fields might be included in the instance boot times table 702 in embodiments where this additional information is collected. As will be described in greater detail below, this information might also be utilized to provide an estimate of the time to availability for an instance having similar characteristics at a future time.

From operation 504, the routine 500 proceeds to operation 506, where the data collection service 118 waits for a predetermined period of time prior to collecting any new actual boot times. For example, the data collection service 118 might wait five minutes or another period of time before collecting any new data. In some embodiments, the data collection service 118 might not wait before collecting additional data. For example, in an embodiment where the data collection service 118 collects data in real-time, the data collection service 118 might not wait before collecting new data.

From operation 506, the routine 500 proceeds to operation 508, where the data collection service 118 removes boot times from the historical boot times data store 116 that are older than a predetermined period of time. For example, the data collection service 118 might remove boot times stored in the historical boot times data store 116 that are more than five minutes old. By "aging" out older data in this way, the estimate regarding the availability of a new instance may be based upon only recent data. In some embodiments the boot times are not aged in this manner and estimates may be computed based upon a larger sampling of actual boot times. From operation 508, the routine 500 proceeds back to operation 502, where the data collection service 118 continues to collect, store, and potentially age out data regarding the actual boot times of instances of computing resources in the manner described above.

Figure 6:
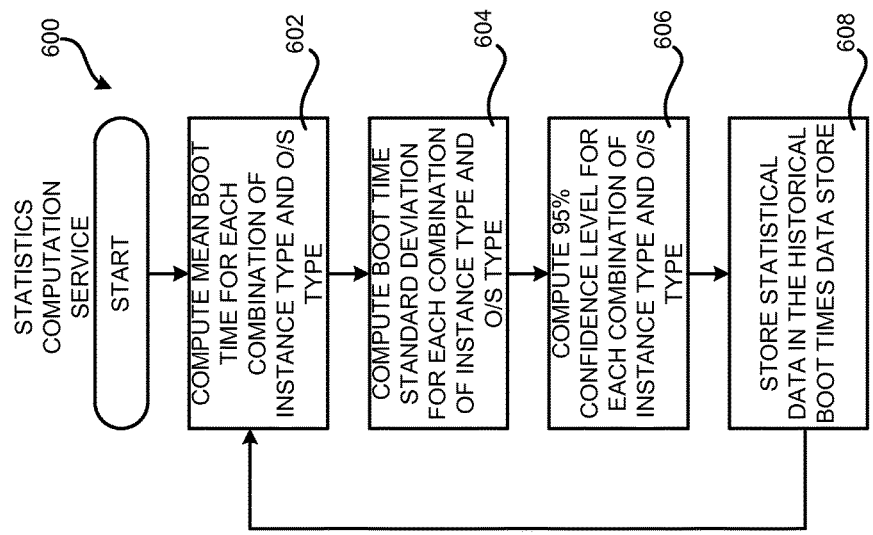
FIG. 6 is a flow diagram showing one illustrative routine that shows aspects of the operation of a statistics computation service utilized to provide an instance availability estimate in one embodiment disclosed herein.

FIG. 6 is a flow diagram showing one illustrative routine 600 that shows aspects of the operation of a statistics computation service 122 utilized to provide an instance availability estimate 114 in one embodiment disclosed herein. As described briefly above, the statistics computation service 122 retrieves the instance boot times 120 stored in the historical boot times data store 116 by the data collection service 122 and generates instance boot time statistics 124 for unique configurations of instances of computing resources. For example, the statistics computation service 122 might generate instance boot time statistics 124 relating to the boot times for virtual machine instances 306 having particular configurations of processor, memory, disk, and operating system. The statistics computation service 122 might also generate instance boot time statistics 124 for other types of instances of computing resources having other types of configurations and characteristics. The routine 600 illustrates additional aspects of this processing.

The routine 600 begins at operation 602, where the statistics computation service 122 generates a mean time to availability for each combination of instance type and operating system. For example, the statistics computation service 122 might compute the mean boot time for "large" virtual machine instances executing the LINUX operating system. Similarly, the statistics computation service 122 might compute the mean boot time for "High CPU" virtual machine instances executing the MICROSOFT WINDOWS SERVER operating system. The statistics computation service 122 might compute the mean boot time for instances having other characteristics in other embodiments.

From operation 602, the routine 600 proceeds to operation 604, where the statistics computation service 122 computes a standard deviation for the time to availability of various configurations of instances of computing resources. For example, the statistics computation service 122 might compute a standard deviation of the recorded actual boot times for each unique configuration of processor, memory, disk, and operating system for virtual machine instances 306. The statistics computation service 122 might also compute the standard deviation of the recorded actual time to availability for various configurations of other types of instances of computing resources.

From operation 604, the routine 600 proceeds to operation 606, where the statistics computation service 122 computes a 95% confidence estimate of the time to availability for each configuration of instances of a computing resource. Other confidence levels might also be computed for the time to availability. In this regard, it should be appreciated that the statistics described above are merely illustrative and that the statistics computation service 122 might compute other types of statistical data describing the actual recorded time to availability of various configurations of instances of computing resources. This information might then be utilized in the manner described herein to provide an estimate of the time to availability for an instance of a computing resource having a particular configuration or characteristics.

From operation 606, the routine 600 proceeds from operation 606 to operation 608, where the statistics computation service 122 stores the statistics computed at operations 602, 604, and 606 in the historical boot times data store 116 in one embodiment. For example, as shown in FIG. 7, the historical boot times data store 116 might include an instance boot statistics table 706 containing fields 704D and 704E for identifying the configuration of instance type and operating system, respectively. The instance boot statistics table 706 might also include a field 704F for storing the computed mean for an instance configuration, a field 704G for storing the computed standard deviation, and a field 704H for storing the computed 95% confidence level.

It should be appreciated that the configuration of the historical boot times data store 116 shown in FIG. 7 is merely illustrative and that the statistics generated by the statistics computation service 122 might be stored in other types of data stores having other configurations in other embodiments. The statistics might also be generated at the time a request 104 is received to launch a new instance. In this way, the statistics need not be generated and stored prior to receiving a request 104. From operation 608, the routine 600 proceeds back to operation 602, described above, where the statistics computation service 122 might continue to compute and store statistics describing the time to availability for various combinations of instances of computing resources.

Figure 8:
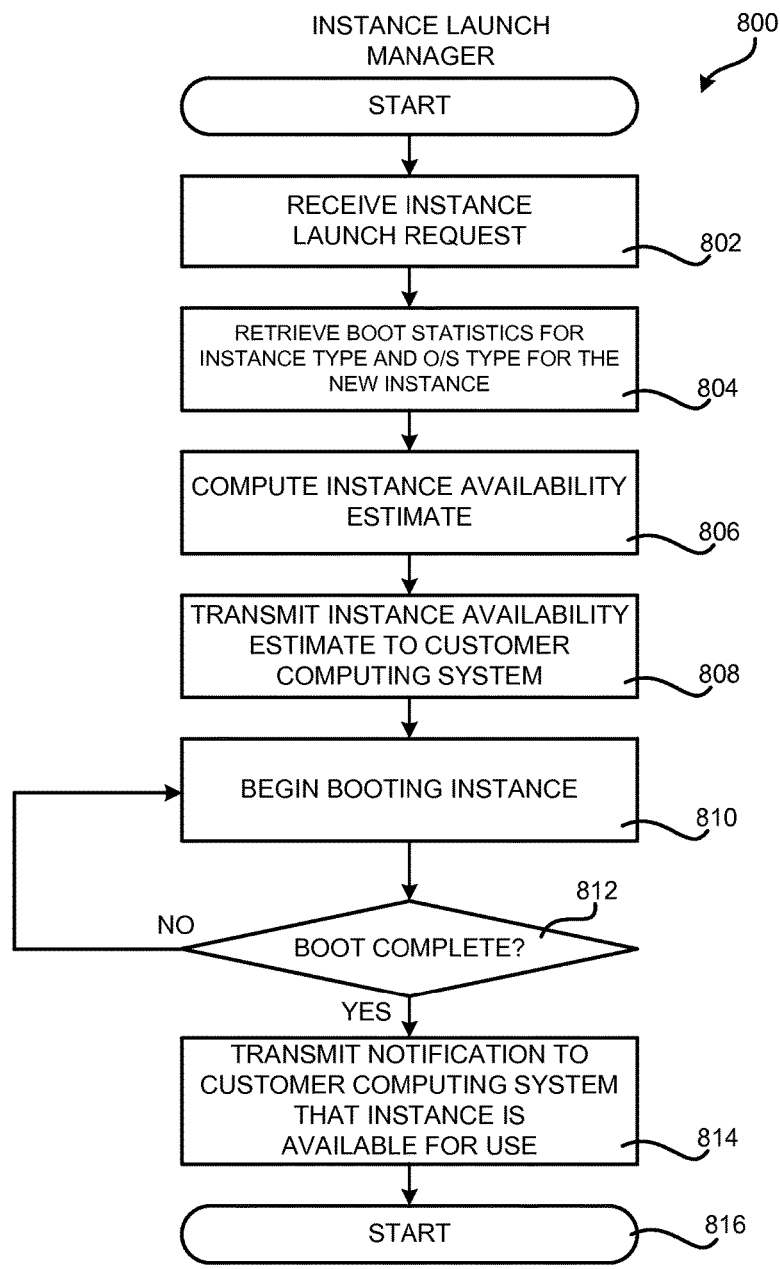
FIG. 8 is a flow diagram showing one illustrative routine that shows aspects of the operation of an instance launch manager configured to provide an instance availability estimate in some embodiments disclosed herein.

FIG. 8 is a flow diagram showing one illustrative routine 800 that shows aspects of the operation of an instance launch manager 110 configured to provide an instance availability estimate 114 in some embodiments disclosed herein. The routine 800 begins at operation 802, where the instance launch manager 110 receives an instance launch request 104. As described above, the instance launch request 104 requests that a new instance of a computing resource be instantiated in the distributed execution environment 108. For example, the instance launch request 104 might request to create and execute a new virtual machine instance having a specified configuration and utilizing a specified operating system.

From operation 802, the routine 800 proceeds to operation 804, where the instance launch manager 110 retrieves the statistics stored in the historical boot times data store 116 for the particular configuration of instance requested in the instance launch request 104. For example, in the case of a virtual machine instance, the instance launch manager 110 retrieves the 95% confidence estimate for the particular instance type and operating system requested in the instance launch request 104. In other embodiments, other statistics might also be utilized. For example, the mean boot time for the particular instance type and operating system requested in the instance launch request 104 might also be retrieved.

From operation 804, the routine 800 proceeds to operation 806, where the instance launch manager 110 computes the instance availability estimate 114. In one embodiment, the statistics retrieved from the historical boot times data store 116 are utilized directly as the instance availability estimate 114. For example, the 95% confidence estimate corresponding to the requested instance type and operating system configuration might be utilized as the time to availability for a new instance having the same type and operating system and/or other characteristics. Similarly, the mean boot time for a particular instance type and operating system configuration might be utilized as the time to availability for a new instance of the same type and operating system. Other statistics might be utilized in other embodiments.

As described briefly above, there may be a delay in some implementations between the time a request 104 is received to instantiate a new instance of a computing resource and the time at which instantiation of the computing resource begins. This delay might be caused, for instance, by the time required for various Web service APIs to be called within the distributed execution environment 108 to begin instantiation of the new instance of the computing resource. As an example, it might be necessary for various Web service APIs to be called in order to begin booting a new virtual machine instance 306 in the distributed execution environment 108.

In order to account for the delay from when a request 104 is received and the time at which instantiation of a new instance begins, the instance launch manager 110 might compute the instance availability estimate 114 in some embodiments to include an estimate of the time between when a request 104 to instantiate an instance is received and when instantiation of the instance actually begins within the distributed execution environment 108. In this way, the estimate 114 of the time to availability may describe the total estimated time from when a request 104 to instantiate a new instance of a computing resource is received and the time at which the new instance will become available for customer use. The instance availability estimate 114 might also include other offsets to account for other types of delays in other embodiments.

From operation 806, the routine 800 proceeds to operation 808, where the instance launch manager 110 transmits the instance availability estimate 114 to the customer computing system 102 that transmitted the instance launch request 104. The customer computing system 102 then displays the instance availability estimate 114 to a user of the customer computing system 102. For example, the customer computing system 102 might render a Web page that indicates that the newly requested instance will be available for use by the customer in a certain number of hours, minutes, and seconds. This number might also be counted down until the time to availability is zero. In other implementations, the instance availability estimate 114 might be presented to indicate the time at which the new instance will become available. Other types of displays might also be provided.

From operation 808, the routine 800 proceeds to operation 810, where the new instance is instantiated in the distributed execution environment 108. For example, in the case of a virtual machine instance, a server 302 in the distributed execution environment 108 might begin booting the new instance. When the new instance has become available for use (i.e. finished booting in the case of a virtual machine instance), the routine 800 proceeds from operation 812 to operation 814.

At operation 814, the instance launch manager 110 might transmit a notification to the customer computing system 102 that the new instance is now available for use. This notification might replace the display of the instance availability estimate 114 presented by the customer computing system 102. Other types of information might also be displayed. Additionally, other types of workflows might also be triggered once a new instance has become available for use. From operation 814, the routine 800 proceeds to operation 816, where it ends.

Figure 9:
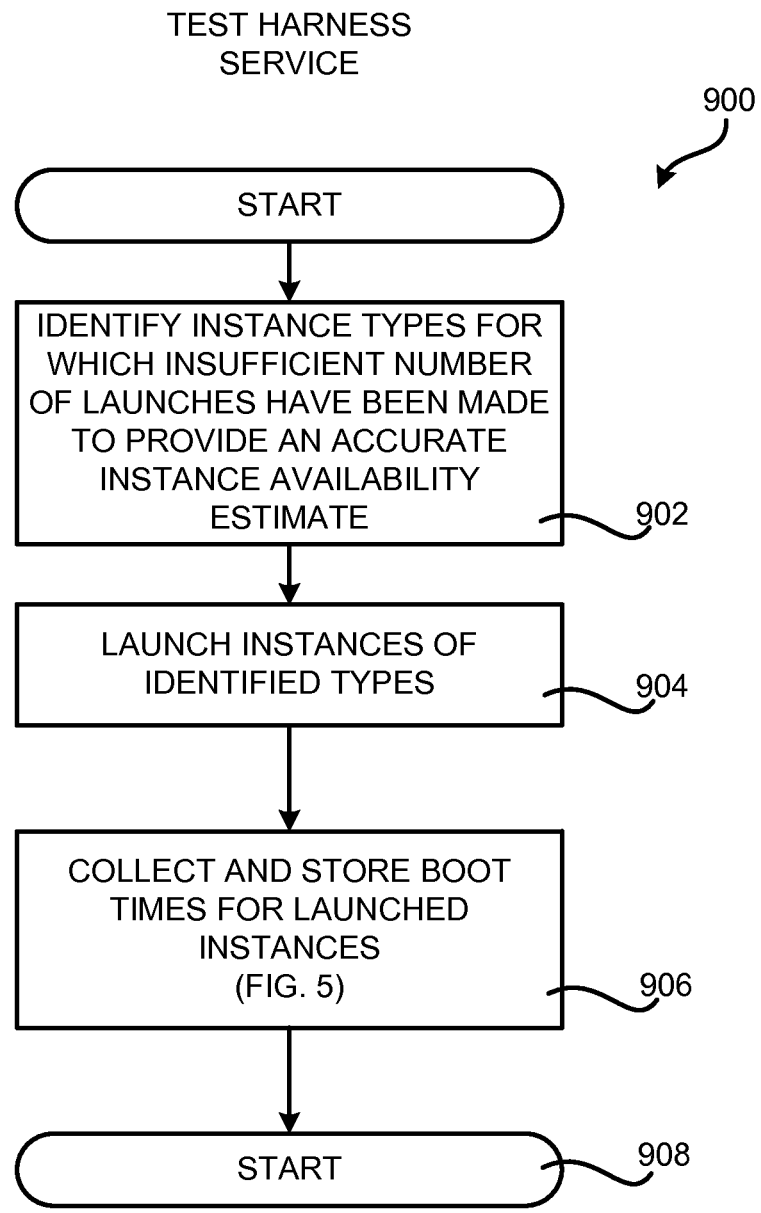
FIG. 9 is a flow diagram showing one illustrative routine that shows aspects of the operation of a test harness service utilized in some embodiments disclosed herein.

FIG. 9 is a flow diagram showing one illustrative routine 900 that shows aspects of the operation of a test harness service 310 utilized in some embodiments disclosed herein to provide an instance availability estimate 114. As discussed above, the test harness service 310 might be utilized in some embodiments to launch instances of certain configurations of computing resources for which insufficient data exists to generate an accurate instance availability estimate 114. For example, if customers or other users of the distributed execution environment 108 rarely launch certain configurations of virtual machine instances, the test harness service 310 might launch instances of the rarely used configurations so that the data collection service 118 can collect data regarding the actual time required for the instances to become available for use. The test harness service 310 might also launch instances of other types of computing resources in order to enable the data collection service 118 to collect data regarding the actual time to availability of the instances. The routine 900 shown in FIG. 9 illustrates this process further.

The routine 900 begins at operation 902, where the test harness service 310 identifies one or more instance types and configurations for which an insufficient number of launches have been made to provide a statistically accurate instance availability estimate 114. For example, customers or other users of the distributed execution environment 108 might rarely launch cluster GPU instances using the LINUX operating system.

From operation 902, the routine 900 proceeds to operation 904 where the test harness service 310 causes instances of the infrequently utilized instance types and configurations to be launched. For example, the test harness service 310 might transmit an instance launch request 104 to the instance launch manager 110 instructing the instance launch manager to launch one or more instances of the infrequently used instance types and configurations. In response thereto, the instance launch manager 110 might cause the specified instances to be generated in the distributed execution environment 108.

From operation 904, the routine 900 proceeds to operation 906, where the data collection service 118 collects and stores data regarding the time to availability for the newly launched instances as described above with FIG. 5. Additionally, the statistics computation service 122 might generate statistics in the manner presented above with regard to FIG. 6 for the newly launched instances. In this way, data can be generated and made available for computing an instance availability estimate 114 for the rarely used instance types.

From operation 906, the routine 900 proceeds to operation 908, where it ends. In other embodiments, the routine 900 might be continually repeated so that data can be continually generated and made available for computing an instance availability estimate 114 for infrequently utilized instance types and configurations.

Figure 10:
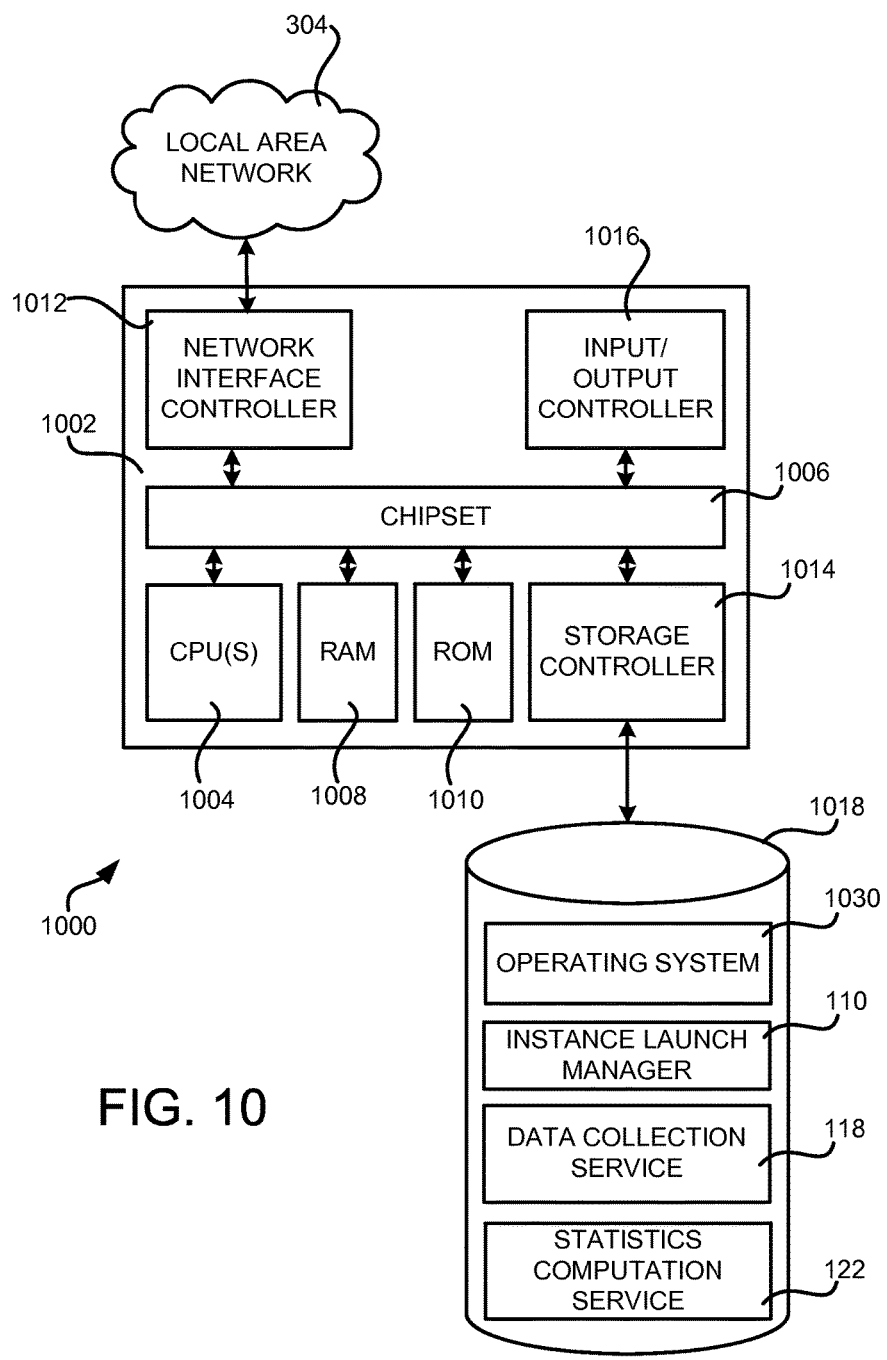
FIG. 10 is a computer architecture diagram showing one illustrative computer hardware architecture for implementing a computing device that might be utilized to implement aspects of the various embodiments presented herein.

FIG. 10 shows an example computer architecture for a computer 1000 capable of executing the program components described above for providing an instance availability estimate 114 in a distributed execution environment 118. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing within the data centers 202A-202N, on the server computers 302A-302F, or on any other computing system mentioned herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 304. The chipset 1006 may include functionality for providing network connectivity through a NIC 1012, such as a gigabit Ethernet adapter. The NIC 1012 is capable of connecting the computer 1000 to other computing devices over the network 304. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1024 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000, such as the instance launch manager 110, the data collection service 118, the statistics computation service 122, and/or any the other software components and data described above. The mass storage device 1018 might also store other programs and data not specifically identified herein.

In one embodiment, the mass storage device 1018 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above with regard to FIGS. 5, 6, 8 and 9.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing an instance availability estimate have been presented herein. Although the disclosure presented herein has been primarily made with reference to the selection and deployment of virtual machine instances, it should be appreciated that the embodiments disclosed herein might also be utilized to provide an availability estimate for instances of other types of computing resources. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
   collecting historical data defining previously measured amounts of time that elapsed while instantiating one or more virtual machine instances to be available for use;
   receiving, from a computing device associated with a user of a network-based resource environment, a request to instantiate a new virtual machine instance in the network-based resource environment;
   determining, at least partly in response to receiving the request and based at least in part on the historical data, an amount of time that will elapse until instantiation of the new virtual machine instance in the network-based resource environment is completed such that the new virtual machine instance is available for use; and
   providing, to the computing device associated with the user, an indication of the amount of time.

2. The computer-implemented method of claim 1, wherein the historical data is collected for virtual machine instances instantiated by customers of the network-based resource environment in which the one or more virtual machine instances are instantiated.

3. The computer-implemented method of claim 1, wherein the historical data is collected for virtual machine instances instantiated by a test harness service executing in the network-based resource environment in which the one or more virtual machine instances are instantiated.

4. The computer-implemented method of claim 1, wherein the historical data comprises first historical data, and the computer-implemented method further comprising collecting second historical data defining hardware upon which the one or more virtual machine instances were executed, wherein determining the amount of time is further based on the second historical data defining the hardware.

5. The computer implemented method of claim 1, further comprising:
   instantiating the new virtual machine instance;
   determining that instantiation of the new virtual machine instance is completed such that the new virtual machine instance is available for use; and
   outputting a notification to the computing device that the new virtual machine instance is available for use.

6. The computer implemented method of claim 1, further comprising:
   identifying an operating system associated with the one or more virtual machine instances; and
   determining that the new virtual machine instance that is requested to be instantiated is associated with the operating system,
   wherein determining the amount of time that will elapse until instantiation of the new virtual machine instance is completed is based at least in part on the new virtual machine instance being associated with the operating system.

7. A system comprising:
   one or more processors; and
   one or more computer-readable media storing computer-executable instructions that, when executed by the one or more processors, cause the one or more processors to:
      collect historical data indicating previously measured amounts of time that elapsed while instantiating one or more instances of computing resources in a network-based resource environment;
      receive, from a computing device associated with a user of the network-based resource environment, a request to instantiate a new instance of a computing resource in the network-based resource environment;
      determine, at least partly in response to receiving the request and based at least in part on the historical data, an amount of time that will elapse until instantiation of the new instance of the computing resource in the network-based resource environment is completed such that the new instance of the computing resource is available for use; and
      prior to completion of the instantiation of the new instance of the computing resource, provide, to the computing device associated with the user, an indication of the amount of time.

8. The system of claim 7, further comprising a data collection service configured to collect the historical data.

9. The system of claim 8, wherein the data collection service is further configured to store the historical data in a historical boot times data store, and wherein the system further comprises one or more computing devices executing a statistics computation service configured to utilize the historical data to compute the amount of time.

10. The system of claim 9, wherein the amount of time is determined by adding the previously measured amounts of time to a time to begin instantiating the new instance of the computing resource in the network-based resource environment following receiving the request.

11. The system of claim 10, wherein the historical data is collected for instances of computing resources instantiated by customers of the network-based resource environment in which the instances are instantiated.

12. The system of claim 10, wherein the historical data is collected for instances of computing resources instantiated by a test harness service executing in the network-based resource environment in which the instances are instantiated.

13. The system of claim 12, wherein the amount of time comprises a 95% confidence estimate of the amount of time.

14. A non-transitory computer-readable storage medium having computer-executable instructions stored thereupon which, when executed by one or more processors, cause the one or more processors to:
   collect first data defining previously measured amounts of time that elapsed to complete instantiation of a plurality of configurations of instances of computing resources in a network-based resource environment;
   collect second data defining hardware upon which the plurality of configurations of instances of computing resources were instantiated;
   identify a specific hardware configuration upon which a specific configuration of an instance of a computing resource is to be instantiated in the network-based resource environment;
   determine, based at least in part on the first data, the second data, and the specific hardware configuration, an amount of time that will elapse until instantiation of the specific configuration of the instance of the computing resource is completed on the specific hardware configuration in the network-based resource environment such that the specific configuration of the instance of the computing resource is available for use; and provide, at least partly in response to receiving a request for instantiation of the specific configuration of the instance of the computing resource, an indication of the amount of time.

15. The computer-readable storage medium of claim 14, wherein the plurality of configurations of the instances of the computing resources are provided by the network-based resource environment.

16. The computer-readable storage medium of claim 15, wherein the amount of time is provided in response to a request to instantiate the instance of the computing resource.

17. The computer-readable storage medium of claim 15, wherein the amount of time is provided in response to a request for the amount of time received via an application programming interface (API).

18. The computer-readable storage medium of claim 15, having further computer-executable instructions stored thereupon which, when executed by the one or more processors, cause the one or more processors to:

store the second data defining the hardware upon which the plurality of configurations of instances of computing resources were executed; and utilize the second data defining the hardware to determine the amount of time for the specific configuration of the instance of the computing resource to be instantiated on the specific hardware configuration.

19. The computer-readable storage medium of claim 15, having further computer-executable instructions stored thereupon which, when executed by the one or more processors, cause the one or more processors to:

store data defining one or more regions in which the plurality of configurations of instances of computing resources were executed; and utilize the data to determine the amount of time for a particular region of the one or more regions.

20. The computer-readable storage medium of claim 15, having further computer-executable instructions stored thereupon which, when executed by the one or more processors, cause the one or more processors to:

store data defining a previous time at which the plurality of configurations of instances of computing resources were executed; and utilize the data defining the previous time at which the plurality of configurations of instances were executed to provide the amount of time that will elapse until instantiation of the specific configuration of the instance of the computing resource is completed at a particular time.

* * * * *